(12) United States Patent
Loitz et al.

(10) Patent No.: US 7,234,625 B2
(45) Date of Patent: Jun. 26, 2007

(54) APPARATUS FOR CONNECTION OF WORKPIECES USING THE FRICTION STIR WELDING METHOD

(75) Inventors: Henry Loitz, Hamburg (DE); Jens P. Wulfsberg, Neritz (DE); Jens von der Wense, Koelln-Reisiek (DE); Alexander von Strombeck, Hamburg (DE); Christoph Schilling, Lütau (DE); Jorge dos Santos, Lüneburg (DE)

(73) Assignee: CKSS Forchungszentrum Geesthacht GmbH

( * ) Notice: Subject to any disclaimer, the term of this patent is extended or adjusted under 35 U.S.C. 154(b) by 0 days.

(21) Appl. No.: 11/160,247

(22) Filed: Jun. 15, 2005

(65) Prior Publication Data
US 2006/0006209 A1   Jan. 12, 2006

(30) Foreign Application Priority Data
Jun. 15, 2004   (DE) .................... 10 2004 028 560

(51) Int. Cl.
*B23K 20/12* (2006.01)
*B23K 37/00* (2006.01)
(52) U.S. Cl. ..................... 228/2.1; 228/112.1
(58) Field of Classification Search ............. 228/2.1, 228/112.1; 156/73.1, 73.5
See application file for complete search history.

(56) References Cited
U.S. PATENT DOCUMENTS

| | | | | |
|---|---|---|---|---|
| 5,893,507 A * | 4/1999 | Ding et al. | ................ | 228/2.1 |
| 6,199,745 B1 * | 3/2001 | Campbell et al. | ........ | 228/112.1 |
| 6,264,088 B1 | 7/2001 | Larsson | | |
| 6,499,649 B2 * | 12/2002 | Sayama et al. | .......... | 228/112.1 |
| 6,604,667 B2 * | 8/2003 | Schilling et al. | ............ | 228/2.1 |
| 6,722,556 B2 * | 4/2004 | Schilling et al. | ......... | 228/112.1 |
| 6,799,708 B2 * | 10/2004 | von Strombeck et al. | ... | 228/2.1 |
| 6,913,186 B2 * | 7/2005 | Vyas | ....................... | 228/112.1 |
| 7,163,136 B2 * | 1/2007 | Hempstead | ................. | 228/2.1 |
| 2002/0179673 A1 * | 12/2002 | Strombeck et al. | ......... | 228/1.1 |

(Continued)

FOREIGN PATENT DOCUMENTS

DE   C119957136   8/2001

(Continued)

*Primary Examiner*—Jonathan Johnson
*Assistant Examiner*—Rachel E. Beveridge
(74) *Attorney, Agent, or Firm*—Hovey Williams LLP

(57) ABSTRACT

An apparatus is proposed for connection of workpieces using the friction stir welding method, with a shaft (33, 33') which can be driven such that it rotates and at whose end remote from the drive end of the shaft a pin-like projection (8) is arranged, at whose end a first stop, which is formed by a first shoulder (6), is arranged, with the first shoulder having a diameter which is larger than the diameter of the pin-like projection (8), and with a second stop (7, 7'), which is formed from a second shoulder and is arranged such that the workpieces (19) to be connected can be enclosed between the stops (6, 7, 7'), in that at least one of the stops can be moved translationally in order to enclose the workpieces (19) with a predetermined force in the direction of the other stop. The apparatus (1) is in this case designed such that the second shoulder (7) or the second stop is designed such that it can be rotated, and the first and the second shoulder (6, 7) or the first and the second stop are designed such that they can be rotated in the opposite sense.

34 Claims, 10 Drawing Sheets

U.S. PATENT DOCUMENTS

Figure 1:
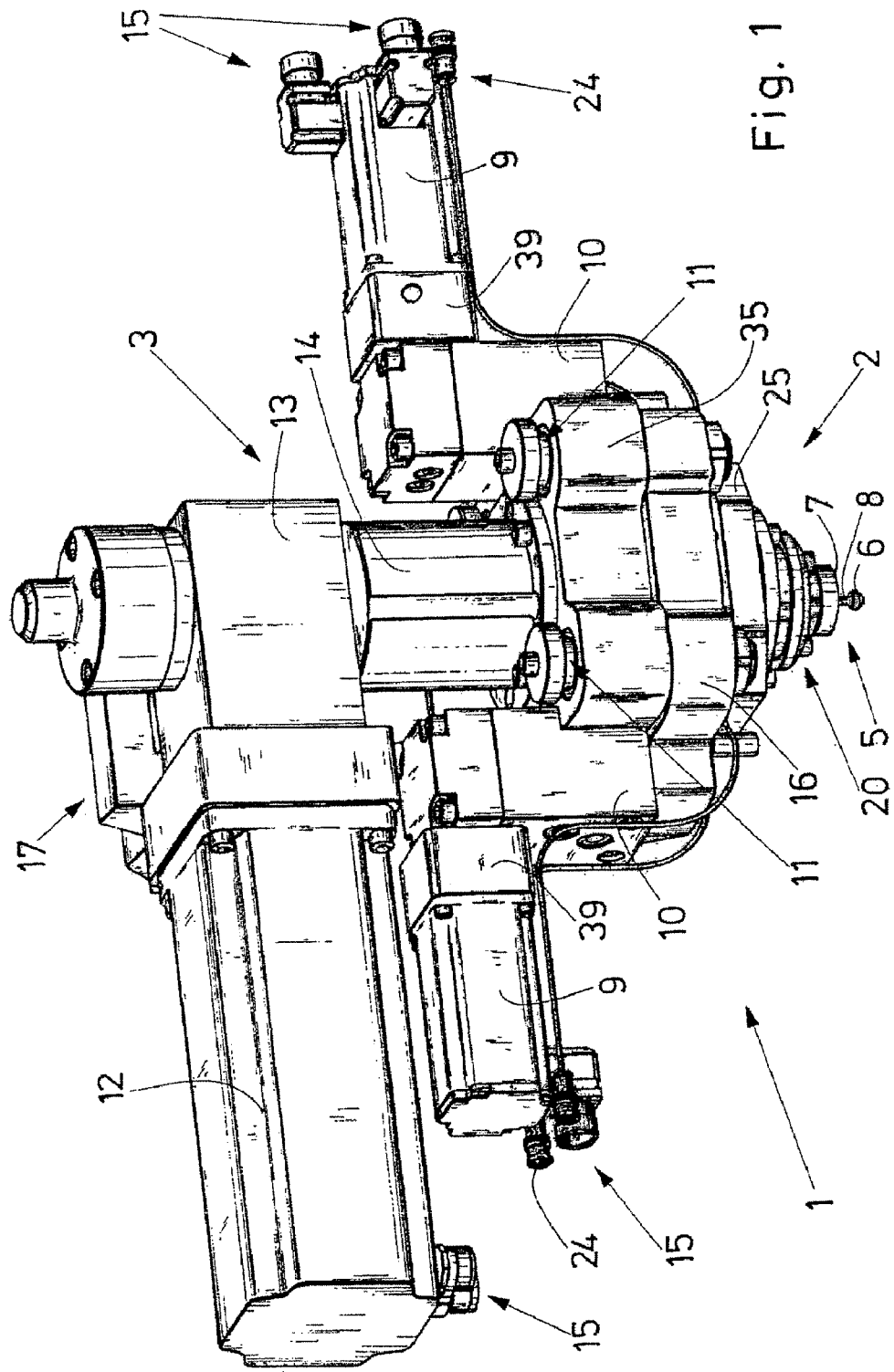

| | | | |
|---|---|---|---|
| 2002/0179682 A1* | 12/2002 | Schilling et al. | 228/112.1 |
| 2004/0046003 A1* | 3/2004 | Vyas | 228/112.1 |
| 2006/0006211 A1* | 1/2006 | Loitz et al. | 228/112.1 |

FOREIGN PATENT DOCUMENTS

| | | |
|---|---|---|
| EP | B1 0615480 | 8/1995 |
| JP | 2001252774 A1 | 9/2001 |
| JP | 2002066760 A1 | 3/2002 |
| JP | 2003266181 A * | 9/2003 |
| JP | 2004050205 A1 | 2/2004 |
| JP | 2004216435 A1 | 8/2004 |
| JP | 2006000928 A * | 1/2006 |
| WO | WO 9310935 | 6/1996 |

* cited by examiner

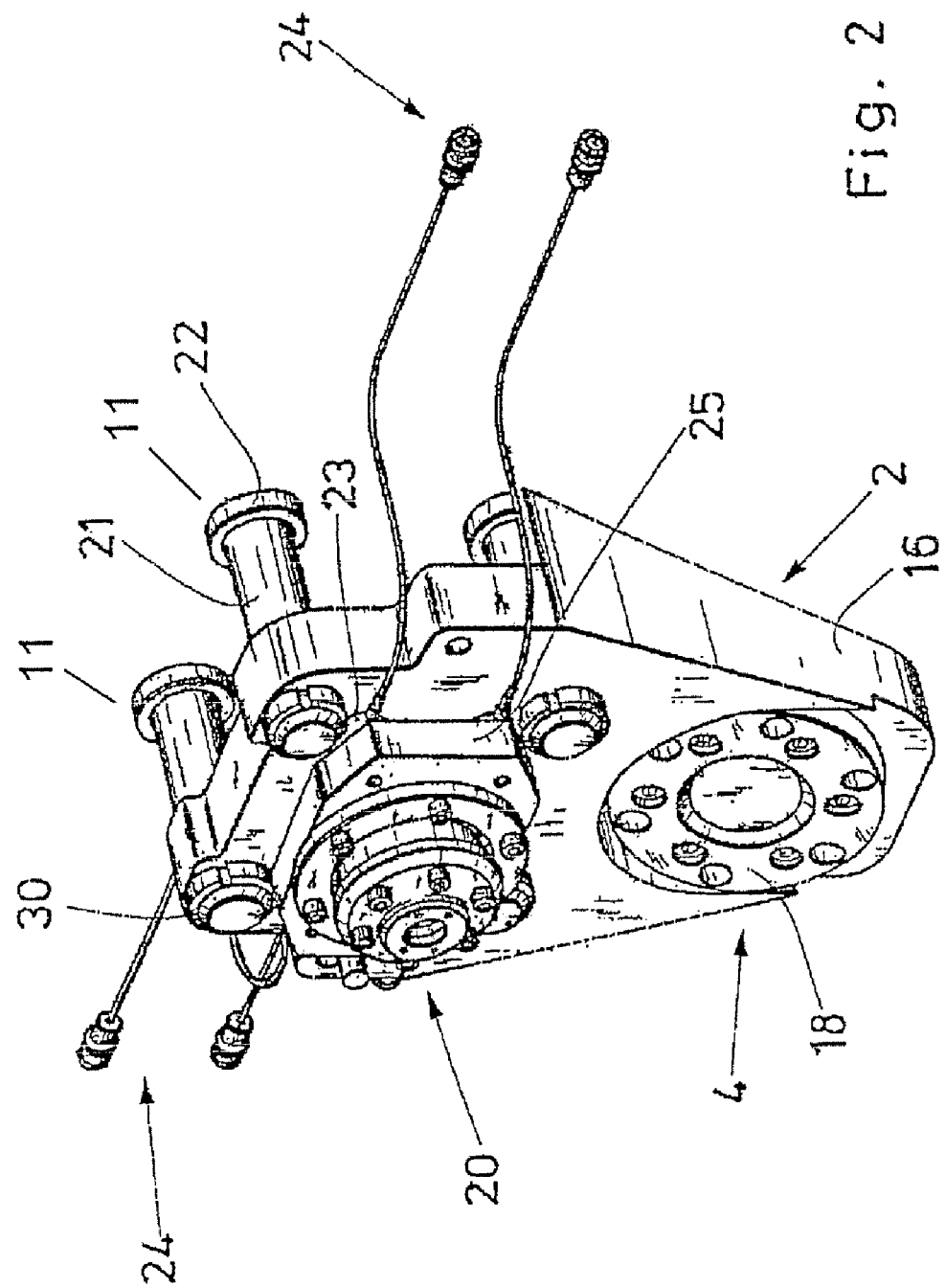

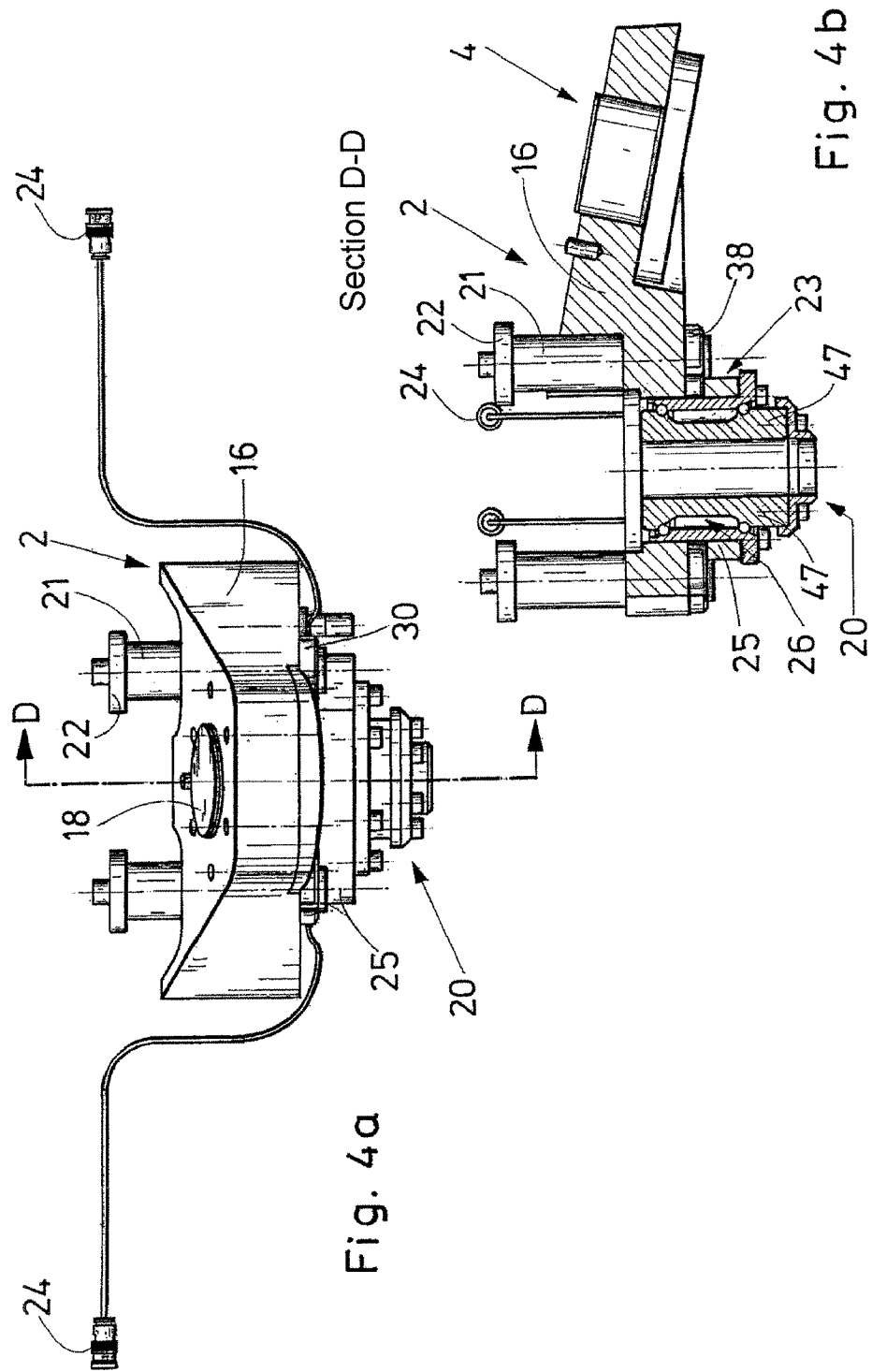

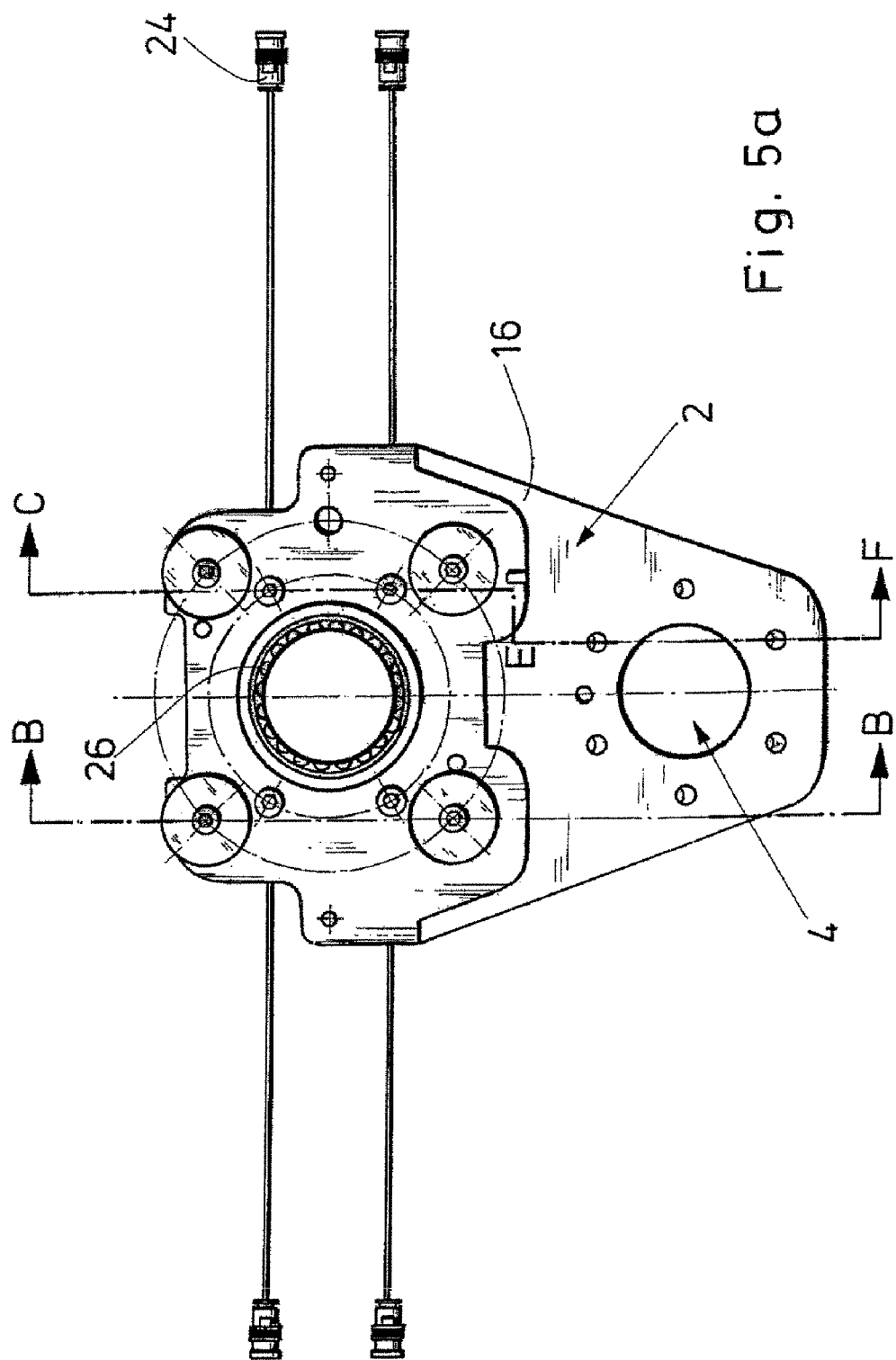

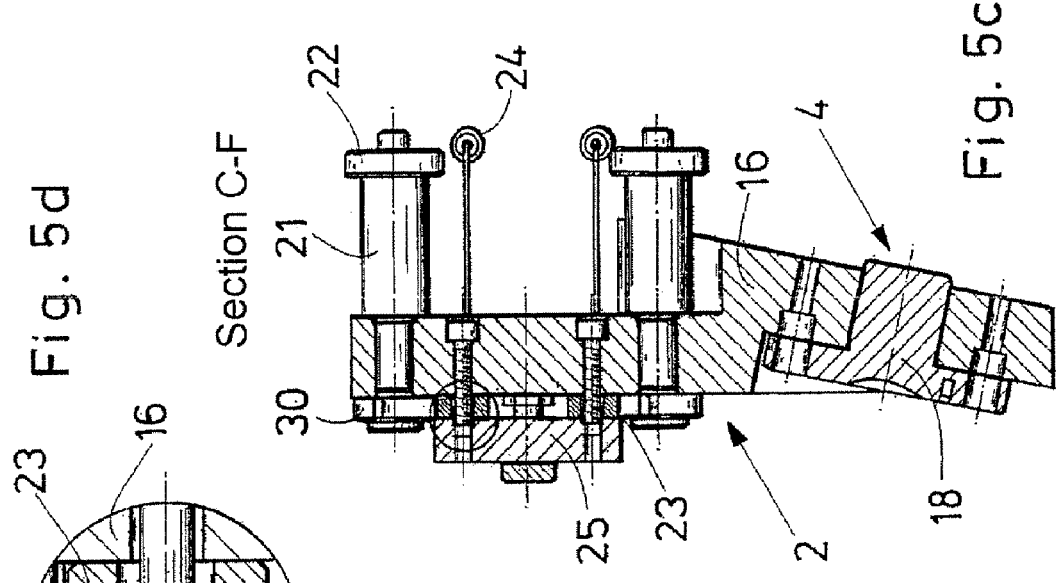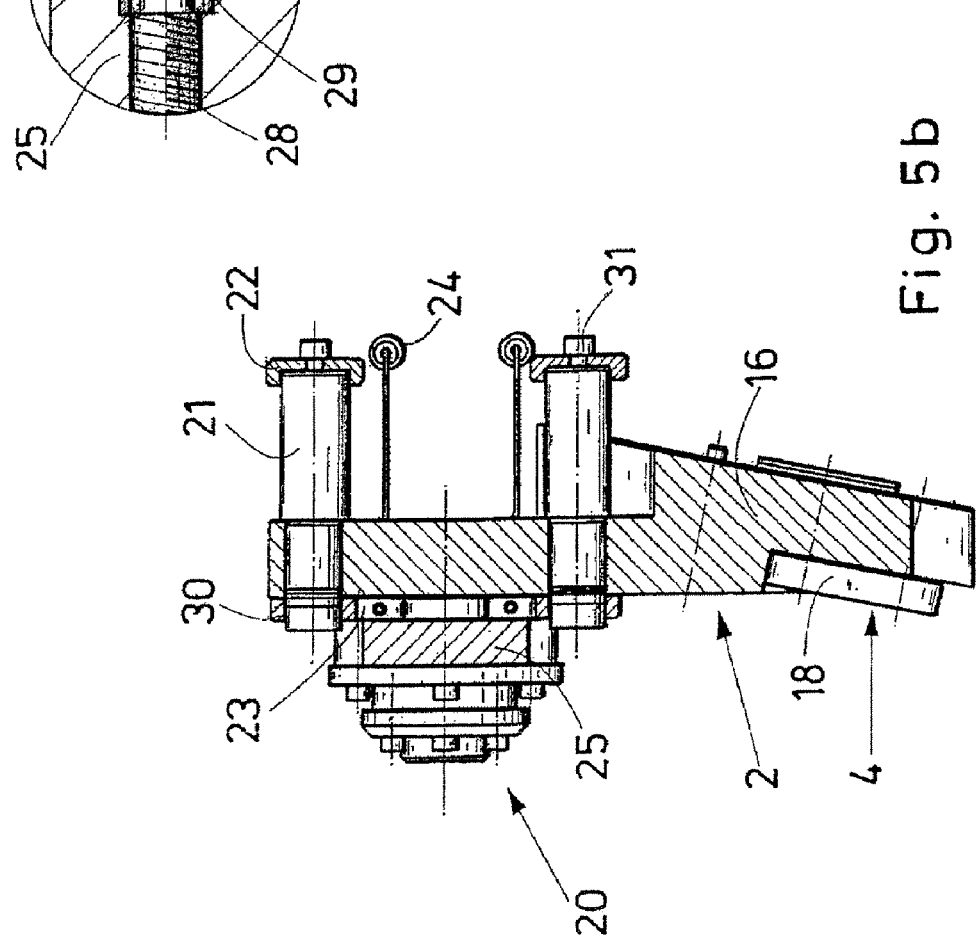

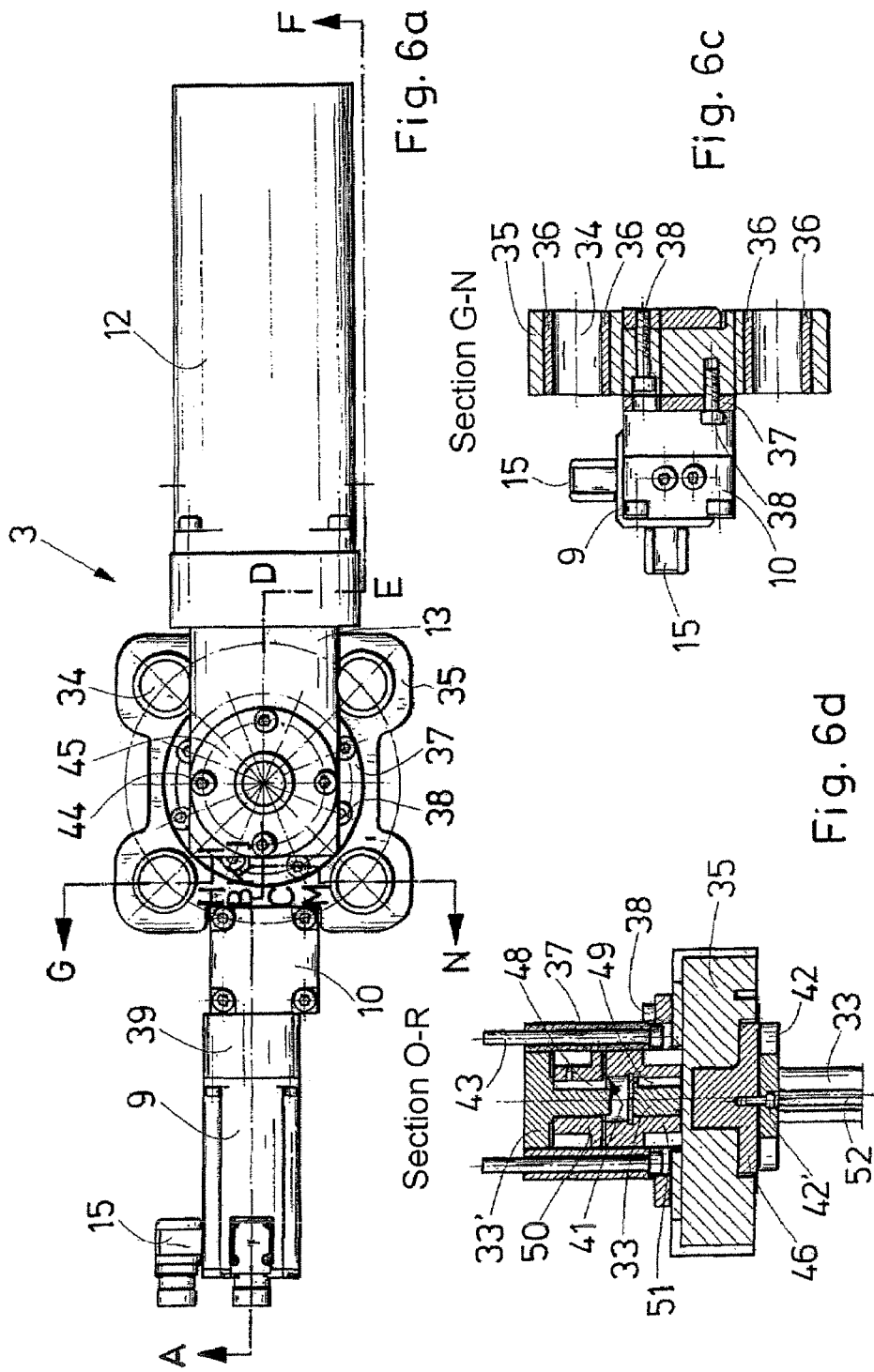

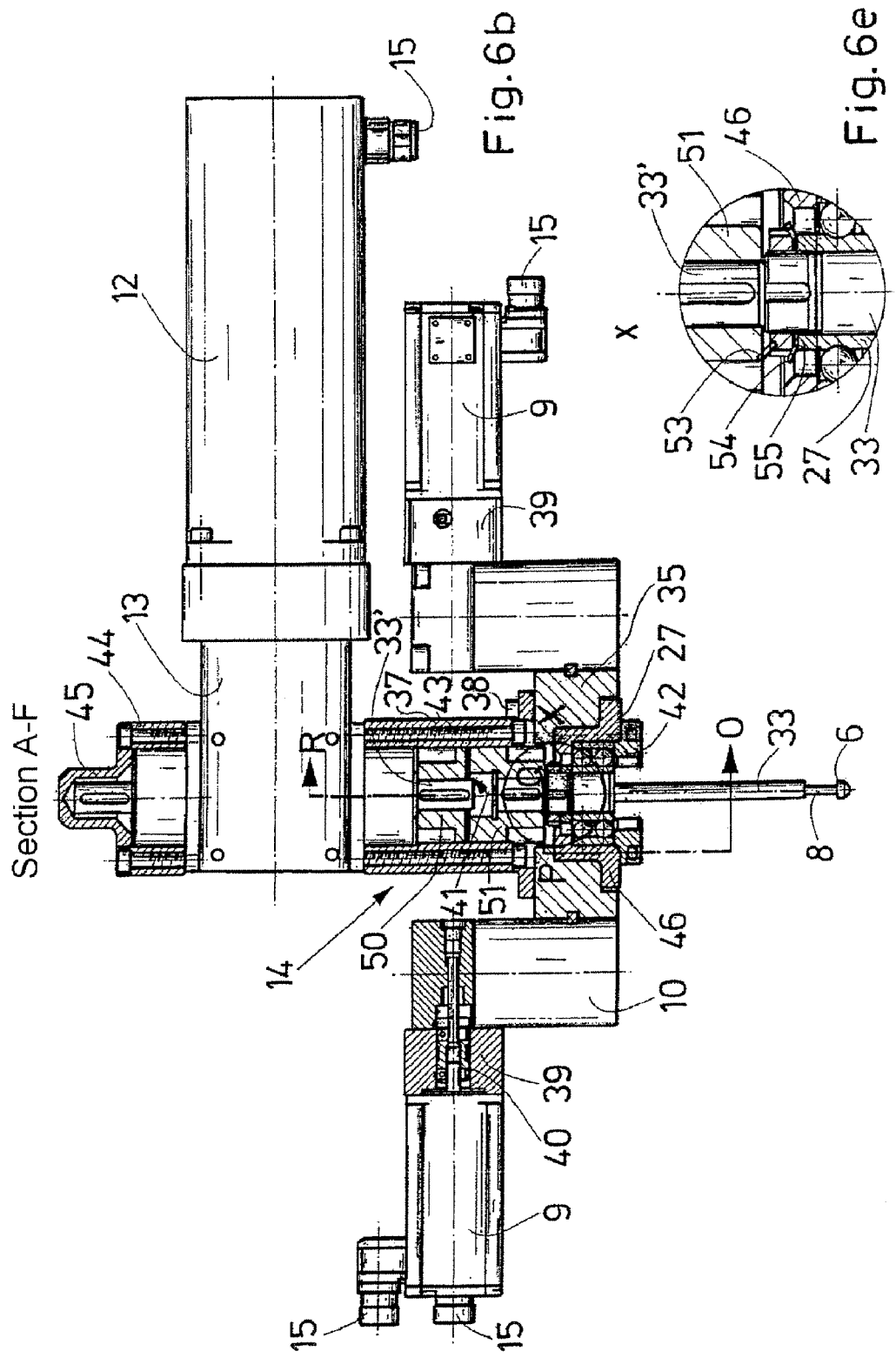

ated type in such a way that the disadvantages of the prior art are overcome.

APPARATUS FOR CONNECTION OF WORKPIECES USING THE FRICTION STIR WELDING METHOD

RELATED APPLICATIONS

This Application claims priority of German Application Serial No. DE 10 2004 028 560.8, filed Jun. 15, 2004, which is hereby incorporated by reference herein.

BACKGROUND OF THE INVENTION

1. Field of the Invention

The invention relates to an apparatus for connection of workpieces using the friction stir welding method with a shaft which can be driven such that it rotates and at whose end remote from the drive end of the shaft a pin-like projection is arranged, at whose end a first stop, which is formed by a first shoulder, is arranged, with the first shoulder having a diameter which is larger than the diameter of the pin-like projection, and with a second stop, which is formed from a second shoulder and is arranged such that the workpieces to be connected can be enclosed between the stops, in that at least one of the stops can be moved translationally in order to enclose the workpieces with a predetermined force in the direction of the other stop.

2. Discussion of Prior Art

An apparatus of this type is known (EP-B-0 615 480 and DE-C-199 57 136). Friction stir welding, a further development of friction welding and also widely known as FSW, has fundamentally been known for several years and has repeatedly been developed further.

Originally, friction welding was carried out by moving two workpieces which are intended to be connected to one another by friction welding against one another in the desired connecting area, pressing them against one another with a force which can be preset in the process. The heat created by the friction in the end results in the material of the workpieces being plasticized in the connecting area. Once the material has been sufficiently plasticized, adequate thorough mixing of the materials of the two workpieces can take place at least in the area of the connection close to the surface, so that the desired welded joint is formed between the two workpieces as they cool down.

In the case of friction stir welding, there is no need for any relative movement between the workpieces in order to produce the friction and the thorough mixing of the materials. Instead of this, a pin-like projection or a cylindrical projection, which is caused to carry out a sufficiently large rotation by a drive or a motor, is placed against the end area of two workpieces which are to be connected and are located such that they abut against one another or overlap one another. With suitable guidance, as can be provided, for example, by means of a specific guide apparatus or else by a robot, the pin-like projection is additionally caused, for example, to carry out a translational movement along the abutting edges of the two workpieces to be connected. The workpieces are prevented from escaping from one another by means of a robust, static opposing bearing.

Once the material of the workpieces has been sufficiently plasticized after the start of the welding process by the friction heat that is produced in the adjacent material area as a consequence of the rotation of the pin-like projection with the material of the workpieces, the translational movement is carried out along the bead profile between the two workpieces while maintaining the rotational movement of the pin-like projection, thus forming, for example, a longitudinal bead.

With regard to the apparatus of this generic type according to EP-B-0 615 480, the workpieces are held together by means of the known apparatus in the area around the abutting edge and the weld bead that is formed by means of two stops with a larger diameter than the pin-like projection, by the pin-like projection being enclosed between the two stops. Those faces of the two stops which face one another effectively form shoulders which each cover the surfaces of both workpieces to be connected in a rotating form on one face of the workpieces around the area of the weld bead that is to be formed. If, by way of example, pressure is exerted by means of the apparatus orthogonally with respect to the surface of the two workpieces to be connected, the contact pressure on the side of the workpieces to be connected which faces away from the pressure is reduced, corresponding to the shoulder there on the basis of the rigid separation between the two shoulders of the two stops. For this reason, special pressure means must be used with this apparatus in order to provide a suitable opposing bearing, as still possible with acceptable complexity for workpieces such as metal sheets and the like which are flat or in the form of panels, but is normally impossible for complicated welded joints produced by means of the friction stirring method owing to the complicated shapes of the workpieces.

Furthermore, industrial robots are used for a wide range of functions in many manufacturing areas, for example for motor vehicle construction or aircraft construction, in which it is not only difficult but even often completely impossible to provide flat or other opposing bearings for producing the welded joint and, furthermore, the robots themselves cannot also produce the required pressure forces, or can do so only in a very highly complex manner.

DE-C-199 57 136 discloses an apparatus in which at least one of the stops for carrying out the welding process can be moved under the influence of the workpieces and can be enclosed with a force that can be predetermined. This makes it possible for the apparatus itself to apply the necessary pressure to both faces of the workpieces to be connected without any opposing bearing being required. Thus, even in the case of complicated workpieces, it is possible to produce weld beads, for example weld beads which run in three dimensions in space, without any substrate being required, which in the past would have had to secure the root of the weld bead, and would at the same time have had to support the workpieces. This makes it possible to avoid the handling system having to apply the force to the workpieces to be connected.

In order to achieve this, a linear-movement cylinder is provided on the apparatus, connected to the rotation shaft, which linear-movement cylinder produces a translational movement when a hydraulic medium is applied appropriately, thus applying the force to the workpieces to be connected.

Furthermore, a first stop is provided, which can rotate, is connected to the rotation shaft, presses against the workpieces to be connected from underneath as a result of the translational movement, and clamps the workpieces against a second, fixed stop.

The fixed upper second stop and the rotating lower first stop result in different temperatures on the left-hand side and right-hand side of the workpieces to be connected during the friction stir welding process, owing to the flowing behavior of the material. This results in different heat distributions within the workpieces to be connected, and this can influence the quality of the weld bead. This is particularly problematic in the case of thin metal sheets, because the resultant temperature difference is very great, because it is impossible to produce a sufficiently great thermal flow to the boundary surfaces by convection. In consequence, the characteristics of the metal sheets may be adversely affected or even destroyed in the weld area, so that it is no longer possible to produce a joint. Furthermore, the temperature difference that exists can influence the quality of the bead.

OJBECTS AND SUMMARY OF THE INVENTION

The invention is thus also based on the object of providing an apparatus by means of which it is possible to join thin-walled or temperature-sensitive workpieces by means of friction stir welding.

This object is achieved by a further independent solution according to the invention, in that the second shoulder or the second stop is designed such that it can be rotated, and the first and the second shoulder or the first and the second stop are designed such that they can be rotated in the opposite sense.

Rotation in the opposite sense makes it possible to set the temperature precisely so that there is no temperature gradient between the faces. The hotter face on the top of the metal sheet is opposite the cold face on the bottom of the metal sheet during rotation in opposite senses, and vice versa, so that the temperatures are immediately equalized by means of a thermal short circuit through the metal sheet. This makes it possible to join thin metal sheets. Furthermore, the moments which are produced by the different rotation directions also virtually cancel one another out, so that the forces and moments on the handling system are reduced, since the apparatus has a neutral behavior externally in this context.

A further teaching of the invention provides that the rotation of the shaft and the movement which produces the force are produced in the apparatus, and are introduced into the workpieces to be produced such that they are decoupled and are not influenced by one another. This considerably reduces the translational breaking-free forces and rotational breaking-free moments, thus allowing accurately controllable starting of the translational and rotational movement processes. Yield stresses which occur in particular at low rotation speeds in the translational system, and which occur suddenly when the breaking-free force is exceeded, are thus reduced, thus suppressing temperature peaks in the workpieces to be connected.

A further teaching of the invention provides for one component of the apparatus according to the invention to be a drive module. In this case, the drive module itself produces the rotation and the translational movement of the at least one shoulder and of the at least one stop. The provision of a drive module which produces the two types of movement separately from one another ensures that the apparatus has a simple design. A further teaching of the invention provides for the shaft, which is a component of the drive module, to be mounted on roller bearings in the apparatus in such a way that an accurate translational movement capability is ensured at high rotation speeds and when high torques have to be transmitted, thus allowing very small translational displacement movements with the full rotational load.

Furthermore, one teaching of the invention provides for the apparatus to have a basic module. The basic module has a holder for the drive module. According to a further teaching of the invention, a roller bearing is provided in the basic module, acting as a bearing for the shaft while maintaining the translational movement capability. The basic module and the drive module are in this case connected via a linear guide which, for example, is a linear bearing. The linear bearing ensures that the translational movement is guided as accurately as possible and that the lateral forces that are produced during the welding process do not act either on the rotational drive or on the translational drive, and thus cannot damage them. Furthermore, the invention provides for an element which produces the translational movement, is positioned between the drive module and the basic module and/or is connected to the drive module and the basic module to be arranged between the basic module and the drive module. This element is a linear-movement cylinder or, alternatively, a linear-movement cylinder system. The linear-movement cylinder system is controlled electrohydraulically and, if two or more cylinders are used, is coupled electronically or in some other suitable manner in order to ensure synchronous running, in which case it is advantageous to provide a stepping motor for this control process. The connection of the two modules via the movement system which produces the translation and can be moved with a controlled force allows the variable force to be maintained as exactly as possible.

A connection for a handling system is provided on the basic module itself and produces a feed movement along those areas of the workpieces to be connected. One such handling system is advantageously a robot. In this case, the robot itself only has to provide the feed movement and need no longer produce any forces for the joining of the workpieces, nor need it absorb any reaction torques, since the rotation and translation are produced in the apparatus and the torques which result from the movement constraint are fully compensated for.

A further teaching of the invention provides for the shaft itself to be driven rotationally via a synchronous motor. A synchronous motor allows the rotation speeds to be controlled optimally. Furthermore, the shaft and rotation drive can be connected to one another via a direction-changing gearbox. The direction-changing gearbox allows the drive to be arranged as freely as possible, thus allowing the apparatus to be handled easily.

In order to allow the forces that act on the workpieces to be controlled as accurately as possible, a further teaching of the invention provides for a sensor or a sensor system to be provided for recording the force acting on the workpieces to be connected. This sensor is arranged such that it acts on the basic module, for example between the second shoulder or second stop and the drive module. The sensor is itself connected to an apparatus controller. In order to achieve good measurement accuracy, the sensor is itself prestressed. A sensor such as this is preferably a piezoelectric measurement washer, which is installed in a prestressed form for fixing purposes and for protection against being destroyed by tensile loads.

From a further teaching of the invention, the second stop is arranged either on the basic module or on the drive module. If the second shoulder or the second stop is arranged on the drive module, it is possible to drive the shoulder or the stop such that it rotates. A second rotation drive is provided for this purpose. In order to likewise achieve low breaking-free forces for the movement of the second shoulder or of the second stop, the latter is likewise provided with roller bearings.

A further teaching of the invention provides that the second shoulder or the second stop can be driven such that it can rotate about a hollow shaft. In this case, the rotation shaft for the first shoulder or the first stop is guided in the hollow shaft. This allows a simple design.

The two rotation drives mean that a suitable controller can be used to set different rotation speeds for the shoulders or the stops, thus in turn making it possible to optimally set the temperatures to be introduced, and their distributions.

Other aspects and advantages of the present invention will be apparent from the following detailed description of the preferred embodiments and the accompanying drawing figures.

BRIEF DESCRIPTION OF THE DRAWING FIGURES

Figure 3A:
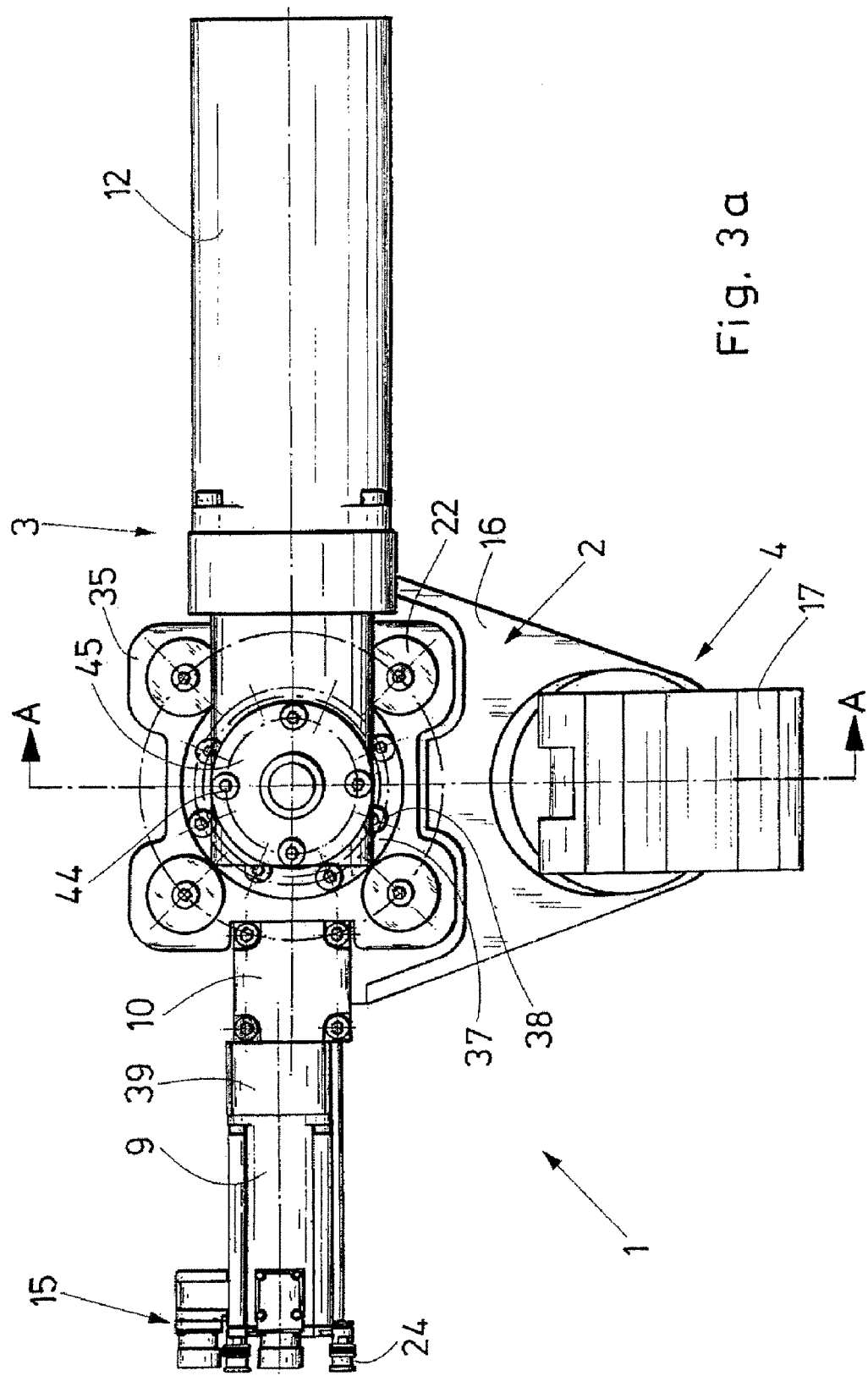
Figure 3B:
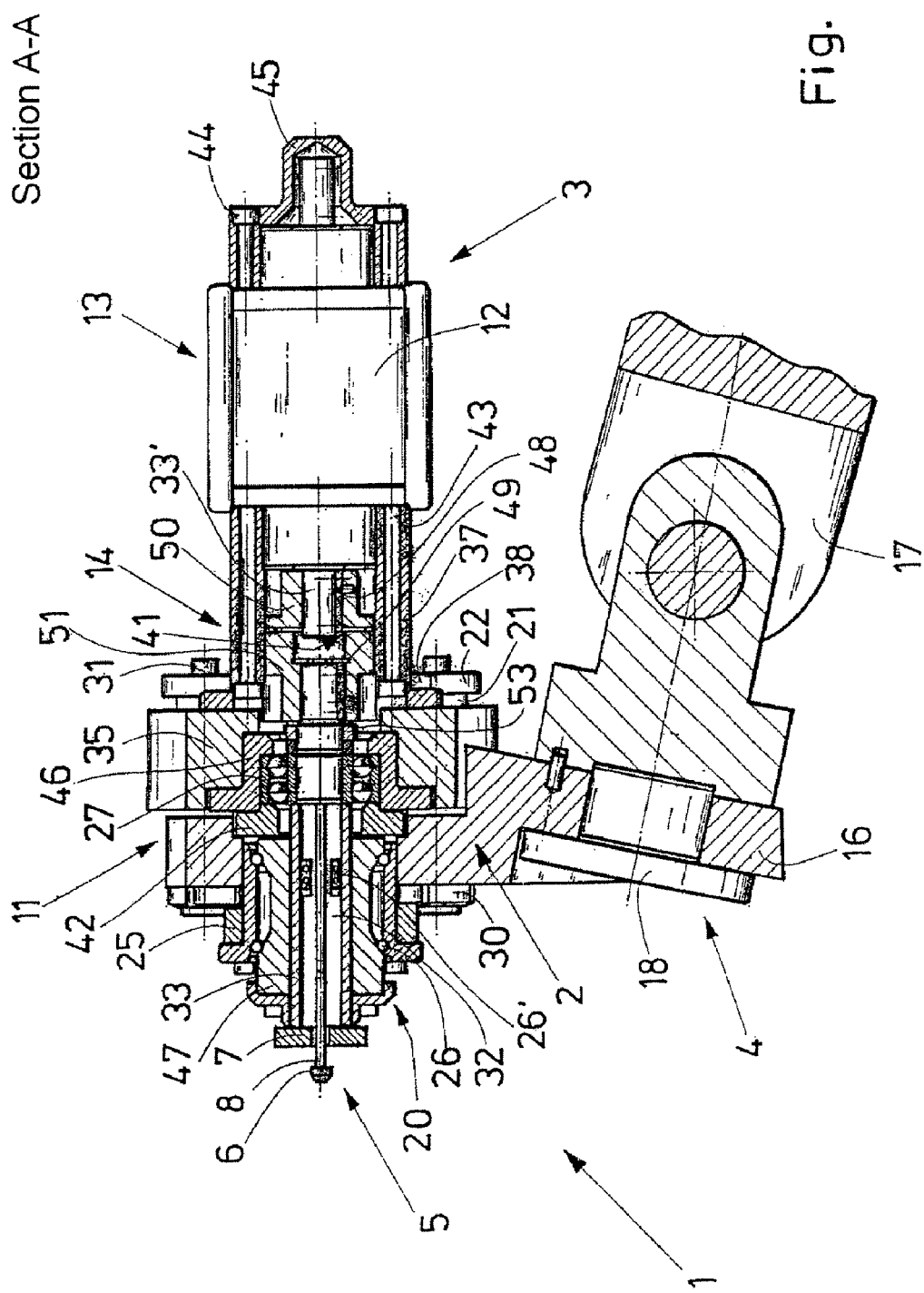
Figure 7:
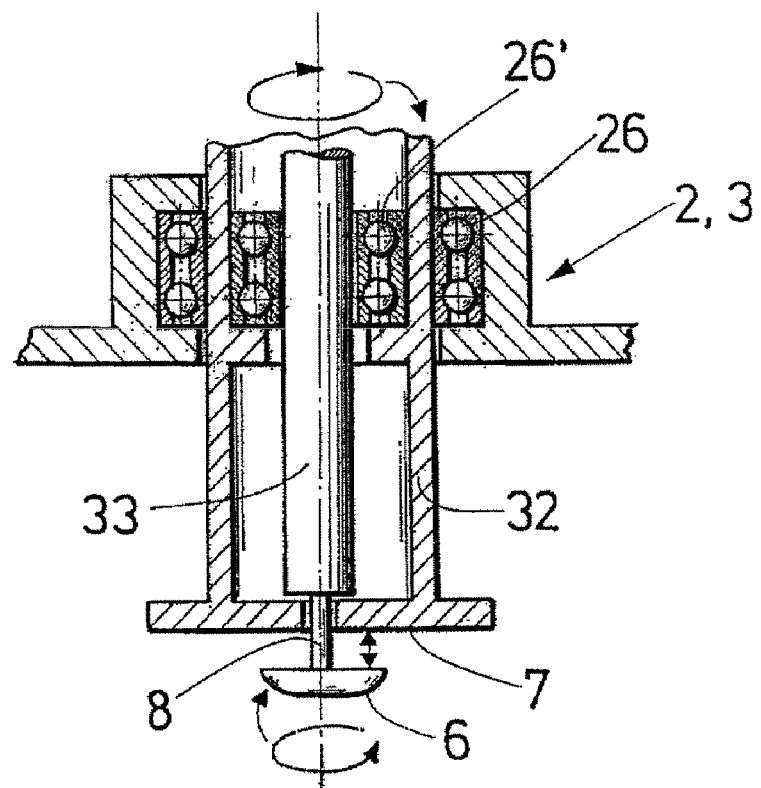
Figure 8:
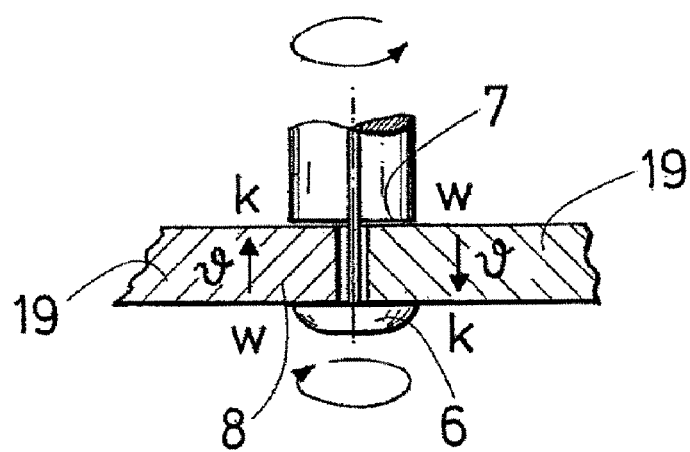

A preferred embodiment of the invention will now be described in detail with reference to the following schematic drawings, in which:

FIG. 1 shows a perspective illustration of the apparatus according to the invention, FIG. 2 shows a perspective illustration of the basic module of the apparatus according to the invention, FIG. 3a shows a plan view of the apparatus according to the invention, FIG. 3b shows a section illustration of the apparatus according to the invention along the line A—A in FIG. 3a, FIG. 4a shows a side view of the basic module, FIG. 4b shows a section illustration of the basic module of the apparatus according to the invention along the line D—D in FIG. 4a, FIG. 5a shows a view from underneath of the basic module of the apparatus according to the invention, FIG. 5b shows a section illustration through the basic module along the line B—B in FIG. 5a, FIG. 5c shows a section view through the basic module of the apparatus according to the invention along the line C-F in FIG. 5a, FIG. 5d shows an enlargement of a detail from FIG. 5c, FIG. 6a shows a plan view of the apparatus according to the invention, FIG. 6b shows a section view through the drive module of the apparatus according to the invention along the line H-F in FIG. 6a, FIG. 6c shows a section view through the apparatus according to the invention along the line G-N in FIG. 6a, FIG. 6d shows a section view through the drive module of the apparatus according to the invention along the line O-R in FIG. 6b, FIG. 6e shows an enlarged illustration of an area x in FIG. 6b, FIG. 7 shows a schematic section view through a further embodiment of the apparatus according to the invention, and FIG. 8 shows an outline sketch of the heat distribution within the workpieces to be connected, in an alternative embodiment of the apparatus according to the invention.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENT

FIG. 1 shows a welding apparatus according to the invention for friction stir welding 1. The apparatus 1 comprises a basic module 2 and a drive module 3, and is connected to a handling apparatus 17. The handling apparatus 17 is, for example, a robot.

The apparatus 1 has a double-shoulder tool 5, which comprises a pin 8, a first shoulder 6 which is fitted such that it is secured to the pin 8, and a second shoulder 7, which can rotate and is provided on the basic module 2 or on the drive module 3. The double-shoulder tool 5 is inserted into a tool holder 20.

The drive module 3 has a tool drive 12 which drives a shaft 33, 33' which is provided in a spindle bearing 14, via a direction-changing gearbox 13. Furthermore, the drive module 3 has a drive (not illustrated) for the hollow shaft 32 with suitable transmission means (likewise not illustrated). The drive module 3 and the basic module 2 are connected to one another via linear bearings 11. As can be seen from FIG. 2, the linear bearing 11 comprises a precision shaft 21 with a stop 22 on the side facing the drive, and with a stop 30 on the side of the linear bearing 11 facing the tool.

The linear bearing 11 allows a translational movement of the drive module 3 with respect to the basic module 2, thus producing a translational movement of the hollow shaft 32 or of the shaft 33. The drive is provided via a linear-movement drive 10, which is connected to a stepping motor 9 in order to control it. The stepping motor 9 and the tool drive 12 have drive connections 15, which supply the appropriate power to the motors 9, 12. As can be seen from FIG. 2, the basic module 2 has a connection 4 in order to connect the welding apparatus 1 to the handling apparatus 17. The connection 4 is provided with a centring journal 18, via which the connection can be made. The tool holder 20 is arranged on a baseplate 25. Measurement sensors 23 are arranged between the baseplate 25 and a base 16 of the basic module 2 and have a measurement sensor connection 24, via which they are connected to a sensor data processing system and/or to a sensor data amplification system and an apparatus controller.

The apparatus 1 is controlled via a system of drive controllers which can operate in real time and combine motion control and PLC functionality. Communication with the controllers for the handling system 17 and with higher-level control systems as well is possible by virtue of a free programming capability and access to analogue/digital inputs/outputs, as well as the capability for linking to various fieldbus systems.

The tool holder 20 has a roller bearing 26, as can be seen in FIG. 4b. FIG. 4b shows a section view along the line D–D, which is shown in FIG. 4a. A holder (shaft guide 47) for the hollow shaft 32 is provided within the roller bearing 26.

FIG. 5b shows a section illustration along the line B—B in FIG. 5a, illustrating how the linear bearing 11 is screwed to the base 16 of the basic module 2. The shaft 21 is in this case additionally secured by the stop 30 on the base 16. At the opposite end of the shaft 21, the stop 22 is mounted detachably on the shaft 21 by means of a cylindrical bolt 31.

FIG. 5b likewise shows the arrangement of the measurement sensors 23. FIG. 5c provides a section illustration through the area of the measurement sensors, running along the line C-F in FIG. 5a. The baseplate 25 and the base 16 of the basic module 2 are connected to one another via necked-down bolts 28. The necked-down bolt 28 runs through the measurement sensor 23. FIG. 5d provides an enlarged illustration of the area of the baseplate 25, of the base 16 and of the measurement sensor 23 arranged between them. The necked-down bolt 28 is in this case arranged in a centring bush 29. The centring bush is located centrally in the measurement sensor 23.

FIGS. 6a to 6e show the design of the drive module 3. FIG. 6a shows a plan view of the drive module 3, which has a drive module baseplate 35 that is provided with holes 34. The precision shafts 21 are introduced into the holes 34 in order to produce the connection between the drive module 3 and the basic module 2. A linear ball bearing 36 is provided in the holes 34, in order to allow the precision shaft 21 to move in the hole 34 with as little friction as possible. This can be seen in FIG. 6c, which shows a section along the line G-N through the drive module 3, as can be seen in FIG. 6a. A gearbox flange 37 is attached via centring bolts 38 to the baseplate 35, as can be seen from FIGS. 6b and 6d. FIG. 6b shows a section through the drive module 3 along the line A-F, as shown in FIG. 6a. FIG. 6d shows a section through the drive module along the line O-R, as illustrated in FIG. 6b.

An intermediate flange 39 is arranged between the stepping motor 9 and the linear-movement drive 10, and has a clutch 40 in it. The stepping motor 9 acts on the linear-movement drive 10 via the clutch 40, as can be seen from FIG. 6b.

A claw clutch 41 is provided in the spindle bearing 14. The claw clutch 41 comprises a clutch upper part 50 and a clutch lower part 51. The clutch upper part 50 is connected to the shaft 33' via an adjusting spring 48. The shaft 33 is connected to the clutch lower part 51 via an adjusting spring 49, as can be seen from FIG. 6d. A cap 45 which closes the apparatus at the top is provided at the upper end of the drive module 3. The cap 45 is fitted to the direction-changing gearbox 13 via centring bolts 44. The drive module baseplate 35 is provided with a hole in the centre through which the shaft 33 is passed. A bearing plate 46 is arranged in this hole, with a roller bearing 27 arranged in it. The roller bearing 27 is held in the bearing plate 46 via a bearing flange 42 which is connected to the bearing plate 46 via centring bolts 42'. The shaft 33 is guided in the roller bearing 27. A spacing disc 55 is provided in the upper end of the roller bearing 27 and is secured by a fluted nut 53 via a locking plate 54. The fluted nut 53 is in this case guided about the shaft 33, as is illustrated enlarged in FIG. 6e.

The gearbox flange 37 represents the outer wall of the spindle bearing 14, and the gearbox 37 is in this case attached to the direction-changing gearbox 13 via centring bolts 43.

FIG. 3b illustrates the welding apparatus 1 in the assembled state. The shaft 33 is in this case inserted through the shaft guide 47 in the basic module. This also applies to the linear bearings 11, in the case of which the precision shafts are passed through the holes 34 in the drive module baseplate 35. FIG. 3b shows a section along the line AA through the apparatus according to the invention as shown in FIG. 3a.

FIG. 7 illustrates, schematically, the arrangement of the hollow shaft 32 and shaft 33. In this case, the second shoulder 7 is formed integrally with a hollow shaft 32. The hollow shaft 32 can be rotated via a further drive, possibly with an intermediate gearbox. The drive and gearbox are not illustrated.

A roller bearing 26' is provided between the shaft 33 and the hollow shaft 32, and guides the shafts with respect to one another. The hollow shaft 32 is in this case guided by a roller bearing 26 in the welding apparatus. Both the hollow shaft 32 and the shaft 33 can be moved translationally in order to apply the necessary force to the workpieces to be connected, for friction stir welding. The rotation of the second shoulder 7 and of the first shoulder 6 in opposite senses, as is illustrated in FIG. 8, results in different heat distributions on the surfaces of the workpieces 19 to be connected. This results in hotter areas W and colder areas K. Heat flows between these areas in order to equalize the temperatures on the surfaces. This equalizing heat flow is positive, since this allows hotspots to be avoided, which have been found to have a negative effect, particularly when carrying out friction stir welding on thin workpieces.

The apparatus 1 operates as follows:

The pin 8 and the first shoulder 6 which is connected to it, are driven by the tool drive 12 via the direction-changing gearbox 13 and the shafts 33, 33'. The second shoulder 7 can likewise be rotated by means of a hollow shaft 32, via a drive train that is not illustrated. In order to allow the necessary force to be applied between the shoulders 6 and 7, the linear-movement drive 10 is connected in a manner that is not illustrated to the base 16 of the basic module 2. When the stepping motor 9 is driven, the drive module 3 is moved translationally with respect to the basic module 2 along the linear bearing 11, so that the first shoulder 6 is pressed against the workpieces. The linear movement may in this case, for example, be 13 mm overall, and may produce forces up to 12 kN. The force that is produced by the linear-movement drive 10 is measured, and is supplied to a controller, via the sensor system comprising the sensors 23. The controller evaluates these force measurement results and uses the stepping motor 9 to control the force that is applied via the linear-movement drive 10. This allows the effective force to be set very accurately. Owing to the decoupling of the translational movement and rotation, the double-shoulder tool 5 or pin 8 and first shoulder 6 can be caused to rotate without any significant breaking-free moments. Furthermore, the translational movement is carried out finely without any breaking-free forces, so that the prestressing forces are distributed continuously, without any peaks. It is thus possible to start the welding process accurately, and torque peaks are avoided. Furthermore, the welding process can be matched to different material thicknesses of the workpieces to be connected by means of the controller for the linear-movement drive.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

LIST OF REFERENCE SYMBOLS

1 Welding apparatus
2 Basic module
3 Drive module
4 Connection on the handling apparatus
5 Double shoulder tool
6 First shoulder
7 Second shoulder
8 Pin
9 Stepping motor
10 Linear movement drive
11 Linear bearing
12 Tool drive 13 Direction-changing gearbox
14 Spindle bearing
15 Drive connection
16 Base
17 Handling apparatus
18 Centring journal
19 Workpiece
20 Workpiece holder
21 Precision shaft
22 Stop
23 Measurement sensor
24 Measurement sensor connection
25 Baseplate
26 Roller bearing
26' Roller bearing
27 Roller bearing
28 Necked-down bolt
29 Centring bush
30 Stop
31 Cylindrical bolt
32 Hollow shaft
33 Shaft
33' Shaft
34 Hole
35 Drive module baseplate
36 Linear ball bearing
37 Gearbox flange
38 Centring bolt
39 Intermediate flange
40 Clutch
41 Claw Clutch
42 Bearing flange
42' Centring bolt
43 Centring bolt
44 Centring bolt
45 Cap
46 Bearing plate
47 Shaft guide
48 Adjusting spring
49 Adjusting spring
50 Clutch upper part
51 Clutch upper part
53 Fluted nut
54 Locking plate
55 Stamped disc
W Hot area
K Cold area

What is claimed is:

1. An apparatus for connection of workpieces using a friction stir welding method, said apparatus comprising:
   a shaft which can be driven such that it rotates;
   a pin-like projection arranged at an end remote from a drive end of the shaft;
   a first stop, which is formed by a first shoulder, is arranged on an end of the pin-like projection, with the first shoulder having a diameter which is larger than the diameter of the pin-like projection, and
   a second stop, which is formed from a second shoulder and is arranged such that the workpieces to be connected can be enclosed between the stops, in that at least one of the stops can be moved translationally in order to enclose the workpieces with a predetermined force in the direction of the other stop, wherein the second shoulder or the second stop is designed such that it can be rotated, and the first and the second shoulder or the first and the second stop are concurrently rotatable in opposite rotational directions.

2. The apparatus according to claim 1, wherein the apparatus is designed such that the rotation of the shaft and the movement which produces the force are produced in the apparatus, and are introduced into the workpieces to be connected such that they are decoupled and are not influenced by one another.

3. The apparatus according to claim 1, wherein a drive module is provided.

4. The apparatus according to claim 3, wherein the drive module produces the rotation of the shaft.

5. The apparatus according to claim 3, wherein the drive module produces the translational movement of the at least one shoulder or of the at least one stop.

6. The apparatus according to claim 5, wherein the shaft is a component of the drive module.

7. The apparatus according to claim 6, wherein the shaft includes roller bearings.

8. The apparatus according to claim 3, wherein a basic module is provided.

9. The apparatus according to claim 8, wherein a holder for the drive module is provided on the basic module.

10. The apparatus according to claim 9, wherein a roller bearing in which the shaft is mounted is provided in the basic module.

11. The apparatus according to claim 8, wherein the basic module and the drive module are connected via a linear guide.

12. The apparatus according to claim 11, wherein the linear guide is a linear bearing.

13. The apparatus according to claim 11, wherein an element which is arranged between the basic module and the drive module is provided in order to produce the translational movement, and is connected to the basic module and to the drive module.

14. The apparatus according to claim 13, wherein the element is a linear-movement cylinder.

15. The apparatus according to claim 13, wherein the element is a linear-movement cylinder system.

16. The apparatus according to claim 15, wherein the linear-movement cylinder system is controlled electrohydraulically.

17. The apparatus according to claim 15, wherein a stepping motor is provided for controlling the linear-movement cylinder system.

18. The apparatus according to claim 8, wherein a connection for a handling system is provided on the basic module.

19. The apparatus according to claim 18, wherein the handling system is configured to produce a feed movement along the areas of the workpieces to be connected.

20. The apparatus according to claim 19, wherein the handling system is a robot.

21. The apparatus according to claim 8, wherein a sensor is provided for recording the force acting on the workpieces to be connected.

22. The apparatus according to claim 21, wherein the sensor is arranged between the second shoulder or the second stop and the drive module such that it acts on the basic module.

23. The apparatus according to claim 22, wherein the sensor is connected to a controller for the apparatus.

24. The apparatus according to claim 23, wherein the sensor is a piezoelectric measurement washer.

25. The apparatus according to claim 24, wherein the sensor is prestressed.

26. The apparatus according to claim 8, wherein the second shoulder or the second stop is arranged on the basic module.

27. The apparatus according to claim 3, wherein the second shoulder or the second stop is arranged on the drive module.

28. The apparatus according to claim 27, wherein a second rotating drive is provided for driving the second shoulder or the second stop.

29. The apparatus according to claim 28, wherein the second shoulder or the second stop includes roller bearings.

30. The apparatus according to claim 29, wherein a hollow shaft is provided, about which the second shoulder or the second stop is rotatable.

31. The apparatus according to claim 30, wherein the rotation shaft for the first shoulder or for the first stop is guided in the hollow shaft.

32. The apparatus according to claim 1, wherein a synchronous motor is provided to rotationally drive the shaft.

33. The apparatus according to claim 32, wherein the shaft is connected to its rotating drive via a direction-changing gearbox.

34. The apparatus according to one of claims 1, wherein the rotation speeds of the shoulders or stops can be set to be different.

* * * * *